(12) United States Patent
Eldridge

(10) Patent No.: US 6,759,831 B1
(45) Date of Patent: Jul. 6, 2004

(54) POWER SUPPLY DISABLER

(76) Inventor: John T. Eldridge, P.O. Box 1533, Duvall, WA (US) 98109

( * ) Notice: Subject to any disclaimer, the term of this patent is extended or adjusted under 35 U.S.C. 154(b) by 0 days.

(21) Appl. No.: 09/590,776

(22) Filed: Jun. 8, 2000

Related U.S. Application Data

(60) Provisional application No. 60/138,406, filed on Jun. 8, 1999.

(51) Int. Cl.$^7$ .............................. H02V 7/00; H02J 1/00
(52) U.S. Cl. ...................................... 320/135; 307/141
(58) Field of Search ................................ 320/133, 155, 320/127, 135; 307/10.1, 150, 141

(56) References Cited

U.S. PATENT DOCUMENTS

| | | | |
|---|---|---|---|
| 2,360,152 A | 10/1944 | Nensel | 200/60 |
| 3,535,282 A | 10/1970 | Mallory | 200/60 |
| 4,249,111 A | 2/1981 | Gluck | 315/360 |
| 4,623,957 A | 11/1986 | Moore et al. | 362/200 |
| 4,875,147 A | 10/1989 | Auer | 362/205 |
| 5,089,762 A * | 2/1992 | Sloan | 320/127 |
| 5,138,538 A | 8/1992 | Sperling | 362/205 |
| 5,159,257 A * | 10/1992 | Oka et al. | 320/136 |
| 5,173,653 A | 12/1992 | Hochstein | 320/13 |
| 5,204,194 A | 4/1993 | Miller et al. | 429/7 |
| 5,469,346 A | 11/1995 | Haut et al. | 362/205 |
| 5,691,619 A * | 11/1997 | Vingsbo | 361/56 |
| 6,037,744 A * | 3/2000 | Rhodes | 320/104 |
| 6,066,899 A * | 5/2000 | Rund et al. | 307/10.7 |

FOREIGN PATENT DOCUMENTS

| | | |
|---|---|---|
| JP | 59-216428 A * | 12/1984 |
| JP | 60-39316 A * | 3/1985 |
| WO | WO 93/18337 * | 9/1993 |

OTHER PUBLICATIONS

Motorola inc., "Programmable Timer—MC14541B", 1/94, entire document.*
Microchip Technology Inc., PIC16C5X; EPROM/ROM--Based 8–bit CMOS Microcontroller Series, 2000, see the entire document.*

* cited by examiner

Primary Examiner—Gregory J. Toatley, Jr.
(74) Attorney, Agent, or Firm—John T Eldridge

(57) ABSTRACT

A power supply disabler that can be retrofitted to a battery-operated device includes a resettable timer, a switch and a pair of electrodes, all of which are fitted in a thin profile case. The case is configures to fit between a pair of series-connected batteries while the batteries are installed in the battery-operated device. When the battery-operated device is turned on, the switch is closed and the timer is reset and started so that power saving device provides a conductive path between the batteries. After a predetermined time period, the timer causes the switch to open-circuit the conductive path, thereby disabling the power supply. Thus, the power supply is prevented from supplying power to the battery-operated device. The timer is reset when the battery-operated device is subsequently turned on for the next use.

7 Claims, 2 Drawing Sheets

POWER SUPPLY DISABLER

RELATED APPLICATION

This application claims the benefit of U.S. Provisional Patent Application No. 60/138,406, filed on Jun. 8, 1999.

FIELD OF THE INVENTION

The present invention relates to power saving apparatus for use with battery-operated devices and, more particularly, power saving apparatus that can be inserted between series connected batteries within the battery-operated device to disable the power supply.

BACKGROUND OF THE INVENTION

There are many battery-operated devices that use two or more series-connected batteries. However, many of these battery-operated devices do not have any mechanism for conserving power other than the user turning the device on or off. For example, two "D" size batteries are often used in series in a standard flashlight. Once the flashlight is turned on, the flashlight continues to consume power from the batteries until the user turns off the flashlight. One problem is that the user may forget to turn off the flashlight when finished, or the flashlight may be accidentally turned on when stored in a toolbox, drawer, etc. Of course, many other battery-operated devices (e.g., toys, radios, etc.) are susceptible to this problem.

One solution to this problem is to provide a "smart" device that can monitor the status of the batteries. For example, many devices have a "sleep" mode that turns off the device or reduces the power consumption of the device after a predetermined period of time during which the device was not used or had no activity. However, this solution does not address the problem of existing devices that do not have this capability. Accordingly, there is a need for a power saving apparatus that can be easily and inexpensively retrofitted to existing battery-operated devices.

SUMMARY OF THE INVENTION

In accordance with aspects of the present invention, a power supply disabler that can be retrofitted to a battery-operated device is provided. In one aspect of the invention, the power supply disabler includes a resettable timer, a switch and a pair of electrodes, all of which are fitted in a thin profile case. The case is configured to fit between a pair of series-connected batteries while the batteries are installed in the battery-operated device. In operation, the power saving apparatus is inserted between a pair of batteries of the battery-operated device. Initially, the timer is turned off and the switch is closed so that the power saving device provides a conductive path between the batteries. When the battery-operated device is turned on, the timer is reset and initiated while the switch maintains the conductive path. After a predetermined time period, the timer causes the switch to open-circuit the conductive path, thereby disabling the power supply. Thus, the power supply is prevented from supplying power to the battery-operated device. In one embodiment, the predetermined time period is about twenty minutes. The timer is reset when the battery-operated device is subsequently turned on for the next use.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
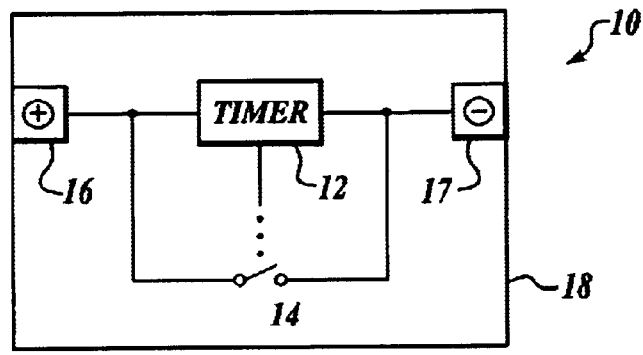
FIG. 1 is a block diagram illustrating a power supply disabler for battery-operated devices according to one embodiment of the present invention.

FIG. 1 illustrates a power supply disabler 10 for the battery-operated devices, according to one embodiment of the present invention. The power supply disabler 10 includes a resettable timer 12, a switch 14, a positive electrode 16 and a negative electrode 17, which are mounted in a thin profile housing 18. In one embodiment, the housing 18 has a nominal thickness of about 0.125 inches and is made of non-conductive material (e.g., plastic). By using commercially available components to implement the timer 12, the switch 14 and the electrodes 16 and 17, those skilled in the art can implement the power supply disabler 10 to fit in the housing 18 by utilizing the teachings of the present disclosure. The inventor of the present invention has found that this thickness allows the power supply disabler to be inserted between the first and second batteries in many types of battery-operated devices (e.g., flashlights, radios, toys, etc.). This feature allows such battery-operated devices to be easily retrofitted with the power supply disabler 10.

Figure 3:
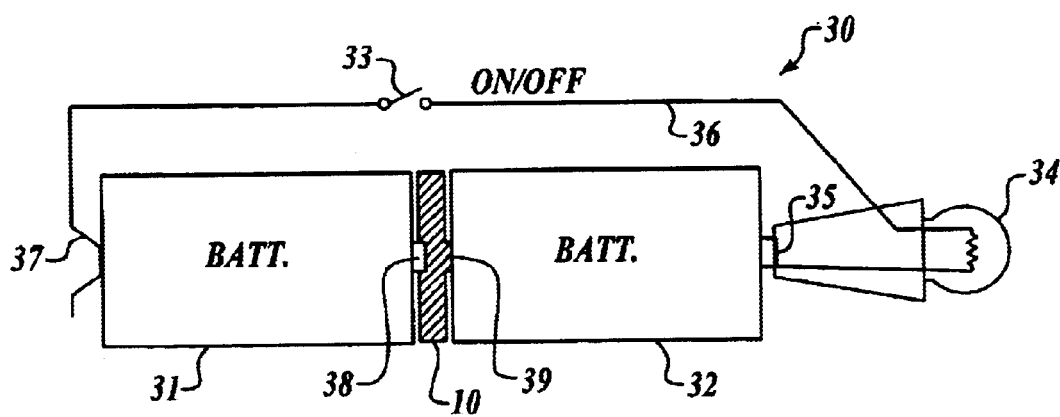
FIG. 3 is a diagram illustrating a power supply disabler according to the present invention in use with standard 1.5 volt batteries.

Electrodes 16 and 17 are respectively configured to be connected to the positive terminal of a first battery (see FIG. 3) and the negative terminal of a second battery (see FIG. 3). The first and second batteries form a power supply for providing power to a battery-operated device. In a typical application, the batteries would be of the same type (e.g., size D batteries). The timer 12 is connected to electrodes 16 and 17, and receive power from this power supply when a circuit is completed between the negative terminal of the first battery and positive terminal of the second battery. Generally, this circuit is completed when the battery-operated device is turned on. The timer 12 does not provide a path for providing power to operate the battery-operated device. The timer 12 has an output lead connected to a control terminal of the switch 14.

When the switch 14 is turned on, a conductive path is formed between the electrodes 16 and 17, thereby completing the circuit between the first and second batteries to enable the power supply. In contrast, when the switch is turned off, the electrodes 16 and 17 are, in effect, electrically isolated from each other. As a result, the power supply formed by the first and second batteries is disabled.

Figure 2:
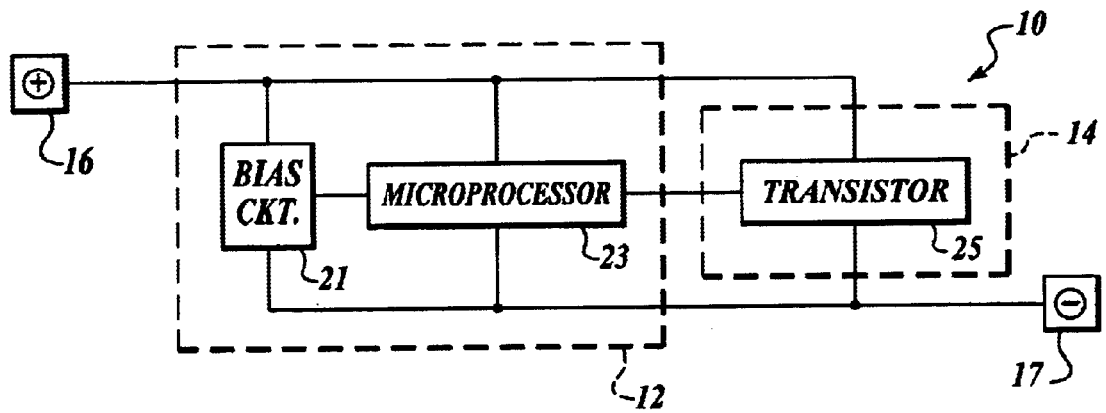
FIG. 2 is a schematic diagram illustrating one implementation of the power supply disabler of FIG. 1.

FIG. 2 illustrates one implementation of the power supply disabler 10 (FIG. 1). In this embodiment, the timer 12 of power supply disabler 10 includes a bias circuit 21 and a timer IC (integrated circuit) 23. The timer IC 23 can be implemented with any suitable commercially available timer IC. Preferably, the timer IC includes a "power on reset" feature that allows the timer IC to be reset by powering the time IC off and then on again. In addition, the timer IC 23 is preferably a low voltage IC capable of operating with a supply voltage of about equal to the voltage of one battery (e.g., 1.5 volts). The implementation of bias circuit 21 generally depends on the requirements of the timer IC 23 and is used to "program" the timer IC 23 with a desired time period. Typically, the bias circuit 21 is a resistor-capacitor network having resistor(s) and capacitor(s) with values that achieve the desired (i.e., predetermined) time period. The bias circuit 21 may optionally include electrostatic discharge protection circuits. Still further, the bias circuit 21 may include a diode to help prevent undesired current flow from the bias circuit 21 toward electrode 16. The switch 14 is implemented in this embodiment with a suitably rated bipolar or field effect transistor 25. In light of this disclosure, those skilled in the art can determine a transistor suitable for application without undue experimentation. Other embodiments may use other suitable devices to implement the switch 14. The timer IC 23 and the switch 14 may be part of an application-specific integrated circuit (ASIC), or mounted on a small printed wiring board or incorporated in a hybrid. Such technologies are well known in the art. In other embodiments, timer 12 is implemented using a suitably programmed microprocessor or microcontroller. In view of the present disclosure, those skilled in the art can implement a microprocessor (or microcontroller)-based timer without undue experimentation.

FIG. 3 illustrates one embodiment of the power supply disabler 10 used with a pair of standard 1.5 volt batteries in a battery-operated flashlight 30. The flashlight 30 includes a first battery 31 and a second battery 32, which form a power supply for the flashlight 30. In addition, the flashlight 30 includes an on/off switch 33 and a light bulb 34. The light bulb 34 has a positive lead 35 electrically connected to the positive terminal of the battery 32 and a negative lead 36 connected to one terminal of the on/off switch 33. The other terminal of the on/off switch is connected to a negative lead 37 that is electrically connected to the negative terminal of the battery 31. The user manually operates the on/off switch 33 to turn the flashlight 30 on and off.

As can be seen in FIG. 3, the power supply disabler 10 is inserted between the batteries 31 and 32. The housing 18 (FIG. 1) of the power supply disabler 10 is formed into a disk shape, having about the same diameter as the batteries 31 and 32. For example, a power supply disabler 10 for use with a size D battery would have a diameter of about one inch. For a size C, AA or AAA battery application, a power supply disabler would have a diameter of 0.750 inches, 0.5 inches and 0.3125 inches, respectively. The power supply disabler 10 operates as described above to turn off the flashlight 30 after a predetermined time, if the user does not turn off the flashlight 30 beforehand using the on/off switch 33. If the user wants to use the flashlight 30 for longer than the predetermined time, the user simply turns the flashlight 30 off and then on, thereby resetting the timer 12 (FIGS. 1 or 2).

In addition, the power supply disabler 10 includes a small indented area 38 and a small protrusion 39. The small indented area 38 is sized to receive the protrusion of the positive terminal of the battery 31. The small protrusion 39 is sized to be about the same size and shape as the protrusion of positive terminal of the battery 31. The small indented area 38 and the small protrusion 39 are defined in part with electrodes 16 and 17, respectively, to help ensure good electrical contact with and proper insertion between the batteries 31 and 32. As previously described, the power supply disabler 10 is made relatively thin to be inserted between the batteries 31 and 32 without damaging the battery-operated device. Although a flashlight application is described, the power supply disabler 10 can be used in other battery-operated devices (e.g., toys, radios, etc.).

Figure 4:
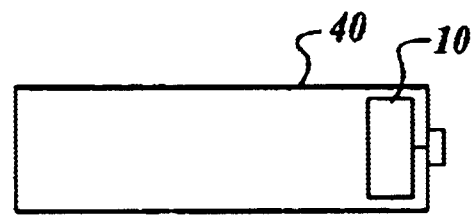
FIG. 4 is a diagram illustrating a power supply disabler incorporated into a battery, according to one embodiment of the present invention.

FIG. 4 illustrates a power supply disabler battery 40 incorporated into a battery, according to one embodiment of the present invention. This embodiment is substantially the same as a battery with the built-in power supply disabler 10 (FIG. 2), with the same dimensions as a standard size battery. Thus, the electrode 17 of the power supply disabler 10 serves as the positive terminal of the power supply disabler battery 40. The user would place at least one power supply disabler battery 40 in a battery-operated device that has at least two series connected batteries serving as the power supply. The power supply disabler battery operates as described above to disable the power supply to conserve battery power. Alternatively, the power supply disabler portion of the power supply disabler battery 40 may be placed at the "negative end" of the battery, with the electrode 17 serving as the negative electrode of the power supply disabler battery 40.

Figure 5:
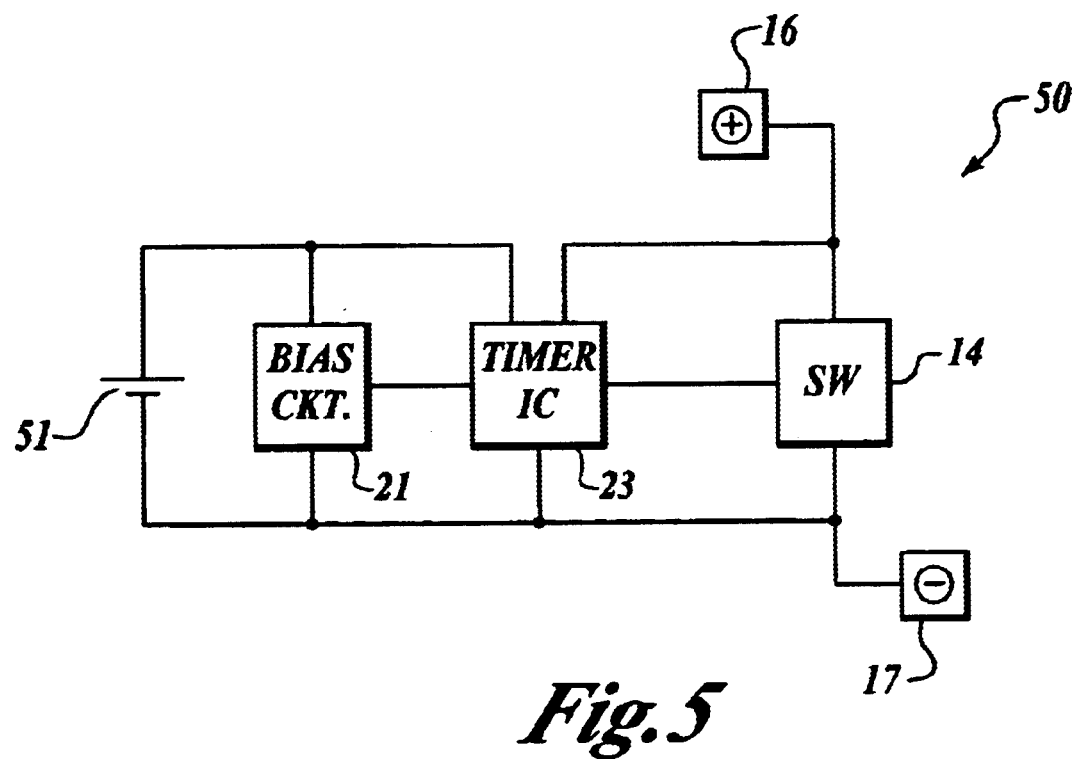
FIG. 5 is a diagram illustrating a power supply disabler according to another embodiment of the present invention.

FIG. 5 illustrates a power supply disabler 50, according to another embodiment of the present invention. The power supply disabler 50 is substantially identical to the power supply disabler 10 (FIG. 2) except that in the alternative power supply embodiment, a commercially available 3.0 volt "button cell" is used to power a Motorola MC14541BD timer IC. The button cell is thin enough to fit within the thin profile of the housing 18 (FIG. 1).

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for disabling current flow in a battery-operated device, the apparatus comprising:

a first electrode configured to be coupled to a terminal of a battery;

a second electrode;

a switch coupled to the first and second electrodes, the switch being configured to provide a conductive path between the first and second electrodes when turned on and being configured to open circuit the conductive path when turned off;

a timer coupled to the switch, wherein the timer is configured to turn off the switch after a predetermined time period has elapsed, the predetermined time period beginning when the battery-operated device is turned on; and a housing upon which are mounted the first and second electrodes, the switch and the timer, wherein the housing is incorporated within the battery.

2. The apparatus of claim 1, wherein the switch includes a field effect transistor.

3. The apparatus of claim 1, wherein the switch includes a bipolar transistor.

4. The apparatus of claim 1, wherein the housing is includes a printed circuit board upon which are mounted the first and second electrodes, switch and timer.

5. The apparatus of claim 1, wherein the first electrode is coupled to a positive terminal of the battery.

6. The apparatus of claim 1, wherein the first electrode is coupled to a negative terminal of the battery.

7. A method for disabling current flow in a battery-operated device, the method comprising:

inserting a battery having a timer device into the battery operated device;

initiating the timer when the battery-operated device is turned on; and interrupting current flow through the battery operated device when a predetermined time has elapsed.

* * * * *